US012548547B2

(12) United States Patent
Kim et al.

(10) Patent No.: US 12,548,547 B2
(45) Date of Patent: Feb. 10, 2026

(54) VEHICLE ACTIVE NOISE CANCELLATION SYSTEM DIAGNOSTIC TOOL

(71) Applicant: Harman International Industries, Incorporated, Stamford, CT (US)

(72) Inventors: Geon-Seok Kim, Novi, MI (US); Michael Hinz, Marktoberdorf (DE); Dylan Michael Stafford, Durham, NC (US); Ismael Mendoza, Queretaro (MX)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 235 days.

(21) Appl. No.: 18/464,096

(22) Filed: Sep. 8, 2023

(65) Prior Publication Data

US 2025/0087198 A1 Mar. 13, 2025

(51) Int. Cl.
*H04R 1/10* (2006.01)
*G10K 11/178* (2006.01)

(52) U.S. Cl.
CPC .. *G10K 11/17835* (2018.01); *G10K 11/17819* (2018.01); *G10K 2210/1282* (2013.01); *G10K 2210/3018* (2013.01); *G10K 2210/3055* (2013.01); *G10K 2210/503* (2013.01)

(58) Field of Classification Search
CPC ....... G10K 11/17835; G10K 11/17819; G10K 2210/1282; G10K 2210/3018; G10K 2210/3055; G10K 2210/503
USPC ................................................ 381/71.4, 71.1
See application file for complete search history.

(56) References Cited

U.S. PATENT DOCUMENTS

2010/0027805 A1* 2/2010 Itou ................. G10K 11/17881 381/71.12
2017/0287461 A1 10/2017 Ku

FOREIGN PATENT DOCUMENTS

EP 3761307 A1 1/2021

OTHER PUBLICATIONS

European Patent Office, Extended European Search Report Issued in Application No. 24196024.4, Jan. 22, 2025, Germany, 10 pages.

* cited by examiner

*Primary Examiner* — Ammar T Hamid
(74) *Attorney, Agent, or Firm* — McCoy Russell LLP

(57) ABSTRACT

Embodiments of a diagnostic tool for an active noise cancelling system are presented. The diagnostic tool may generate an output from the active noise cancelling system and capture input to the active noise cancelling system that results from the output of the active noise cancelling system. The diagnostic tool may generate visual output to aid in evaluation of active noise cancelling systems.

14 Claims, 17 Drawing Sheets

Technique I – Setting threshold from minimum and maximum of each impulse response frequency band

TECHNIQUE 3 – CROSS-CORRELATION INTRODUCTION

802

Normal Correlation

The bigger the better

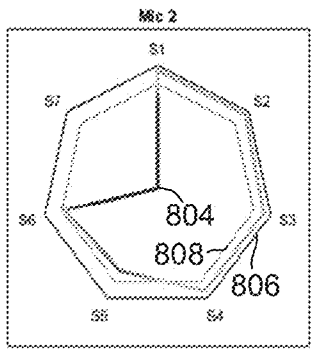

Black polygon shows perfect correlation

Grey polygon shows correlation threshold (e.g. 80%)

Coloured polygon corners

- Centre: Either disconnected or inverted (ambiguity)

820

1(One)-Correlation

Read: Error-Size

The smaller the better

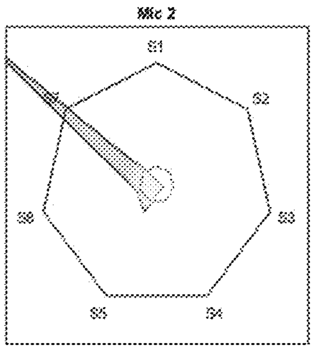

Black polygon shows disconnected state

Grey polygon shows correlation threshold (1-80& = 20%)

Coloured polygon corners:

- Centre: Perfect correlation
- Outside black polygon: inverted polarity

FIG. 8

1. Average impulse response curves of multiple vehicles in the time domain
2. Compute cross-correlation between the average impulse response and test vehicle impulse response
3. Find the minimum correlation of the test vehicles
4. Add a margin to the minimum Cross-correlation example 4. Load a Sample IR or a Sample A2B log. Frequency domain and time domain IR's are plotted in the first and second tabs respectively. A2B logs are plotted in the Accelerometers tab.

5. Review the plots. A normal sample data will be plotted in blue.

Ex. a normal IR.

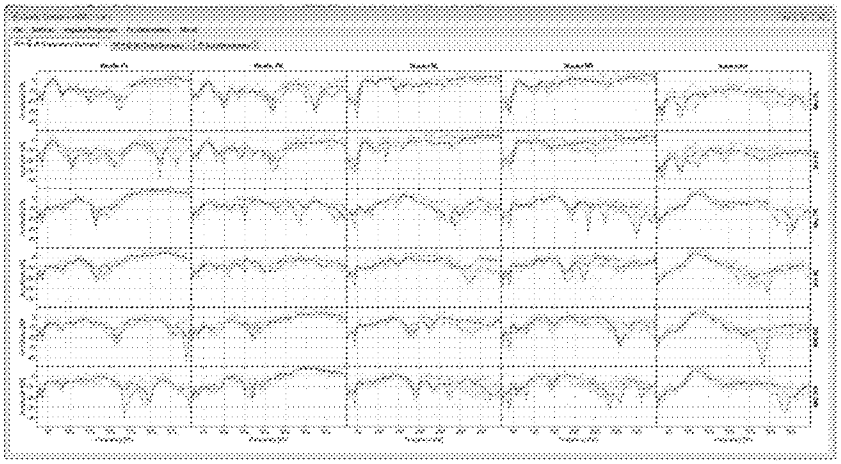

In IR(Frequency Domain) tab and Accelerometers tab. The sample will be compared to the boundaries. When a sample exceed the boundaries, the plots turn red to inform you about the abnormal channel(s).

Ex. An abnormal IR. Woofer FL exceeds boundaries.

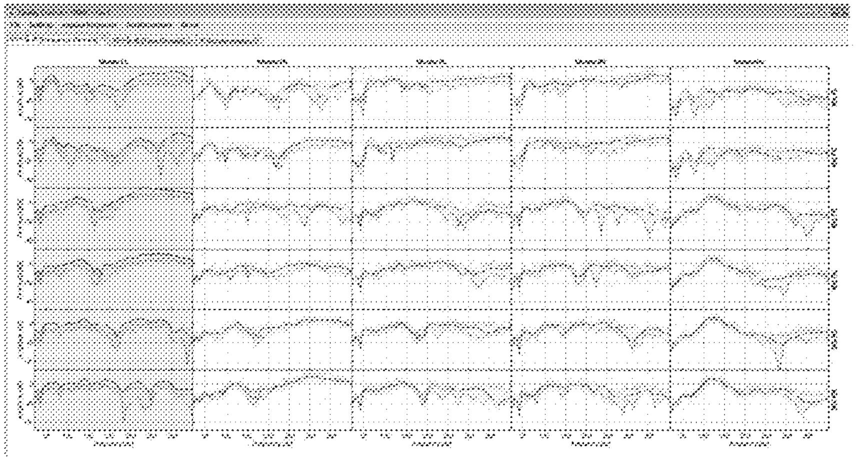

FIG. 15

Ex. An abnormal A2B log.Accel Sensor 2x and Sensor 3z exceed the boundaries.
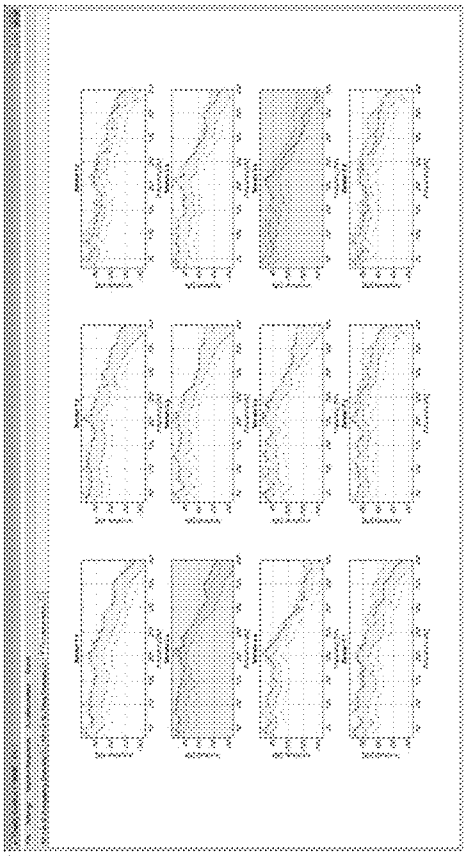
In IR(Time domain), the tool checks if the polarity of the sample IR is correct. If not, the plot turns red.
Ex. Woofer FR has inverted polarity.
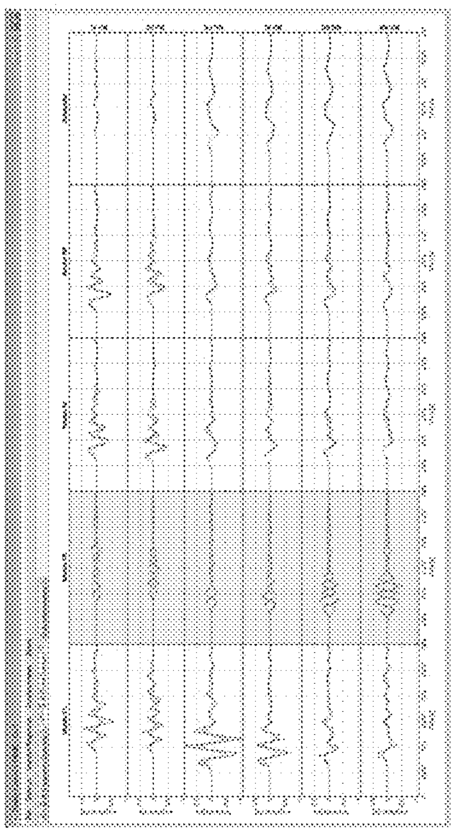
FIG. 16

VEHICLE ACTIVE NOISE CANCELLATION SYSTEM DIAGNOSTIC TOOL

FIELD

This disclosure relates to a diagnostic tool for evaluating a vehicle active noise cancellation system.

BACKGROUND

An active noise cancellation system for a vehicle may generate noise that cancels noise within a passenger compartment of a vehicle. The active noise cancellation system may sense noise within a passenger compartment of a vehicle by way of one or more microphones. The active noise cancellation system may respond to the sensed noise by generating noise via one or more speakers that cancels the noise that is sensed via the one or more microphones. The result is for vehicle passengers to hear substantially less noise in the passenger compartment of the vehicle. More sophisticated active noise cancellation systems may include a plurality of microphones, a plurality of speakers, and a plurality of accelerometers to lower perceived noise within a vehicle passenger compartment.

An active noise cancellation system may include a plurality of components that when operating as desired may provide a significant level of noise reduction for a vehicle passenger compartment. However, it may be possible for degradation of one or more of the active noise cancellation system components to occur during vehicle manufacturing. For example, polarity of wires connected to a speaker may be reversed or a vehicle component may block a microphone or speaker. If one of the active noise cancellation system components experiences degradation, it may be difficult to determine which component is degraded at the time that the vehicle is manufactured or while the vehicle is in use because the active noise cancellation system may remain partially active and because some forms of component degradation may be less noticeable to some vehicle occupants. Further, because of the variation between active noise cancellation system components and vehicle interior construction, an active noise cancellation system of one vehicle may respond slightly different than an active noise cancellation system of a second vehicle. Further still, it may be desirable for an active noise cancellation system diagnostic that is performed at an end of a vehicle assembly line to be reliable (e.g., fewer false positive or false negative indications of active noise cancellation system degradation) and quickly performed since inaccurate diagnostic evaluations and diagnostics that take large amounts of time to perform may have outsized issues that may include, but are not limited to, generating large rework cues and slowing the vehicle assembly line.

SUMMARY

The inventors herein have recognized that it may be difficult to provide a reliable operational assessment of a multi-input-multi-output system applying time based signal processing techniques. In particular, manufacturing tolerances and slight deviations in cabin acoustics between vehicles may make it difficult to establish metrics (e.g., performance thresholds) that may suitable for a large number of units under test. Therefore, it may be desirable to provide a way of diagnosing an active noise cancellation system that more reliably indicates a presence or absence of active noise cancelling system degradation.

By applying cross-correlation between a reference impulse response and an impulse response of a particular active noise cancellation system, it may be possible to generate thresholds that make evaluation of an active noise cancellation more reliable. Alternatively, or in addition, a correlation coefficient may be generated from the reference impulse response and the impulse response of a particular vehicle to determine whether or not the active noise cancelling system of the particular vehicle is operating as may be desired. Further, a cross-correlation technique may be performed rapidly to a system that includes a plurality of inputs and outputs. The present disclosure provides for a diagnostic tool for an active noise cancelling system, comprising: a controller including executable instructions stored in non-transitory memory that cause the controller to initiate an impulse response diagnostic for the active noise cancelling system, where the impulse response diagnostic includes performing a cross-correlation between a reference impulse response and an impulse response of the active noise cancelling system.

In a first example, the diagnostic tool includes where the impulse response diagnostic includes supplying a broadband signal to one or more speakers of the active noise cancelling system and generating sound via the one or more speakers in response to the broadband signal. In a second example that may include the first example, the sound is sensed via one or more microphones of the active noise cancelling system. In a third example that may include one or both of the first and second examples, the diagnostic tool further comprises generating a correlation coefficient based on the reference impulse response and the impulse response of the active noise cancelling system. In a fourth example that may include one or more of the first through third examples, the reference impulse response is based on a plurality of impulse responses determined from an output device and an input device. In a fifth example that may include one or more of the first through fourth examples, the output device is a speaker and where the input device is a microphone or an accelerometer. In a sixth example that may include one or more of the first through fifth examples, the diagnostic tool further comprises generating an indication of degradation of the active noise cancelling system according to a value of the correlation coefficient. In a seventh example that may include one or more of the first through sixth examples, the indication of degradation is an indication of a speaker wired with an inverse electric polarity.

An assessment of an active noise cancelling system may be made by driving a vehicle and observing whether or not a passenger cabin is quiet. However, such assessments may be subjective and they may consume a significant amount of time. Further, it may be difficult for such assessments to ascertain whether noise in a passenger cabin of one vehicle is less or greater than noise in a passenger cabin of a similar vehicle. The present disclosure overcomes the limitations of methods that may be more subjective and assesses operation of a system under test relative to one or more reference vehicles so that a group of vehicles may perform similarly.

As one example, the present disclosure provides for an active noise cancelling system diagnostic method, comprising: supplying a broadband signal to a speaker of an active noise cancelling system; sensing audible output of the speaker responding to the broadband signal via a microphone; and performing cross-correlation analysis on an impulse response generated from a signal output from the microphone sensing the audible output of the speaker. In this way, a crossover frequency of the boost circuit may be adjusted during boost circuit conditions where the frequency of the zero changes so that boost circuit response may be improved.

In a first example, the impulse response is generated by dividing the signal output from the microphone by the broadband signal, and where the active noise cancelling system is performed at an end of a vehicle assembly line after the speaker and the microphone have been installed in the vehicle. In a second example that may include the first example, the method also includes where performing the cross-correlation analysis includes performing a cross-correlation based on a reference impulse response and the impulse response generated from the signal output from the microphone. In a third example that may include one or both of the first and second examples, the method further comprises generating a correlation coefficient based on the reference impulse response and the impulse response generated from the signal output from the microphone. In a fourth example that may include one or more of the first through third examples, the method includes where the reference impulse response is an average impulse response of a plurality of active noise canceling systems of a plurality of vehicles. In a fifth example that may include one or more of the first through fourth examples, the method further comprises displaying the correlation coefficient via a human/machine interface. In a sixth example that may include one or more of the first through fifth examples, the method further comprises displaying the correlation coefficient with a plurality of other correlation coefficients from speakers other than the speaker in a polygon shape via the human/machine interface.

Components of an active noise cancelling system may be tested before assembly; however, testing of an active noise cancellation system in a vehicle may provide actual proof of operation of the entire system and its individual components. Even so, evaluating an active noise cancellation system at an end of an assembly line may have time limitations and the testing environment may act to confound the evaluation. The present disclosure provides for a system that may perform a comprehensive evaluation of an active noise cancellation system including all of its sensors and actuators in a short time frame. Further, the approach may utilize single threshold values so that time consuming interpolations and searches for generating degradation/no-degradation classifications may be reduced or avoided. As a result, the system and method of the present disclosure may meet criteria for end of line testing.

In one or more examples, the present description provides for an end of an assembly line diagnostic tool for an active noise cancelling system, comprising: a controller including executable instructions stored in non-transitory memory of a vehicle being assembled on the assembly line that cause the controller to initiate an impulse response diagnostic for the active noise cancelling system while the vehicle is positioned at the end of the assembly line, where the impulse response diagnostic includes generating correlation coefficients for a plurality of microphones and generating an output on a display (e.g., a vehicle display or a remote display) in response to the generated correlation coefficients.

In a first example, the end of assembly line diagnostic tool includes where the correlation coefficients for the plurality of microphones include a correlation coefficient for each microphone-speaker pair. In a second example that may include the first example, the end of assembly line diagnostic tool includes where the impulse response diagnostic includes performing cross-correlation analysis that includes performing a cross-correlation between an average impulse response of a plurality of active noise cancelling systems of a plurality of vehicles and an impulse response of the active noise cancelling system. In a third example that may include one or both of the first and second examples, the end of assembly line diagnostic tool further comprises determining a minimum cross-correlation between impulse responses of the plurality of active noise cancelling systems of the plurality of vehicles and adding a margin to the minimum cross-correlation between impulse responses of the plurality of active noise cancelling systems. In a fourth example that may include one or more of the first through third examples, the end of assembly line diagnostic tool further comprises indicating degradation of the active noise cancelling system in response to the cross-correlation of average impulse response of the plurality of active noise cancelling systems and the impulse response of the active noise cancelling system being less than the margin plus the minimum cross-correlation between impulse responses of the plurality of active noise cancelling systems.

The present disclosure also provides for an active noise cancelling system diagnostic method, comprising: supplying a broadband signal to a speaker of an active noise cancelling system; sensing vibration output of the speaker responding to the broadband signal via an accelerometer; and performing cross-correlation analysis on an impulse response generated from a signal output from the accelerometer sensing the vibration output of the speaker.

BRIEF DESCRIPTION OF THE DRAWINGS

The disclosure may be better understood from reading the following description of non-limiting embodiments, with reference to the attached drawings, wherein below:

FIGS. 8-11 show examples of how correlation analysis may be visualized for diagnostic tool operators;

FIGS. 13-16 show features of a vehicle active noise cancellation system diagnostic tool.

DETAILED DESCRIPTION

The disclosure provides for systems and methods that address the above-described issues that may arise when assembling an active noise cancellation system for a vehicle. The methods and systems described herein may be implemented in a hand held tool (e.g., a lap-top computer, note pad, pendent, etc.) or within an active noise cancellation system. In one example, the approach may stimulate output from a speaker in a passenger cabin of a vehicle and microphones within the passenger cabin may respond to output of the speaker. Each speaker of the active noise cancellation system may be stimulated with a broadband impulse signal to ascertain how the active noise cancellation system responds to the stimulus. The response of the active noise cancellation system may be evaluated against evaluations of similar systems to determine whether or not the active noise cancellation system that is presently being evaluated meets operational specifications.

Figure 1:
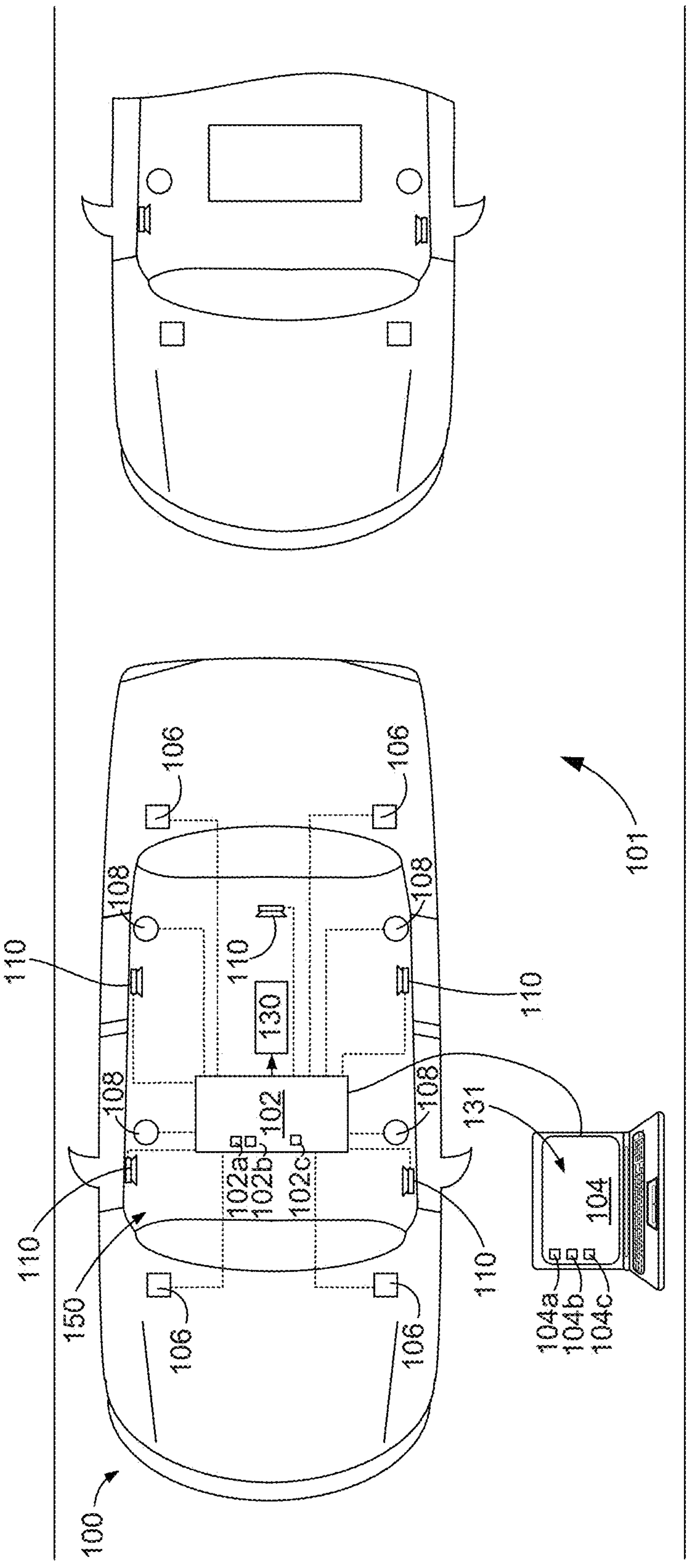
FIG. 1 shows a plan view of a vehicle at an end of an assembly line that includes an active noise cancelling system.

FIG. 1 shows a vehicle 100 at an end of a vehicle assembly line 101. Vehicle 101 includes that includes an active noise cancellation system 15 that comprises speakers 110, microphones 108, accelerometers 106, and an embedded controller 102. Embedded controller 102 includes a controller 102*a* (e.g., central processing unit (CPU), digital signal processor (DSP), etc.), memory 102*b* (e.g., read-only memory, random access memory, etc.), and inputs/outputs 102*c* (e.g., digital inputs, digital outputs, analog inputs, analog outputs). Embedded controller 102 may display information (e.g., data, messages, operational parameters, etc.) and receive user input via display 130. The diagnostic tool described herein may be part of embedded controller 102, or it may be a remote device 104 that is not part of vehicle 100. Remote device 104 may include a controller 104*a* (e.g., central processing unit (CPU), memory 104*b* (e.g., read-only memory, random access memory, etc.), and inputs/outputs 104*c* (e.g., digital inputs, digital outputs, analog inputs, analog outputs). Remote device 104 may display information (e.g., data, messages, programs, applications, and vehicle operating parameters) via display 131. Remote device 104 may communicate with embedded controller 102 via a network link 152 to initiate diagnostic evaluations, receive data from sensors and actuators coupled to embedded controller 102, upload and download applicants/programs, etc.

Figure 2:
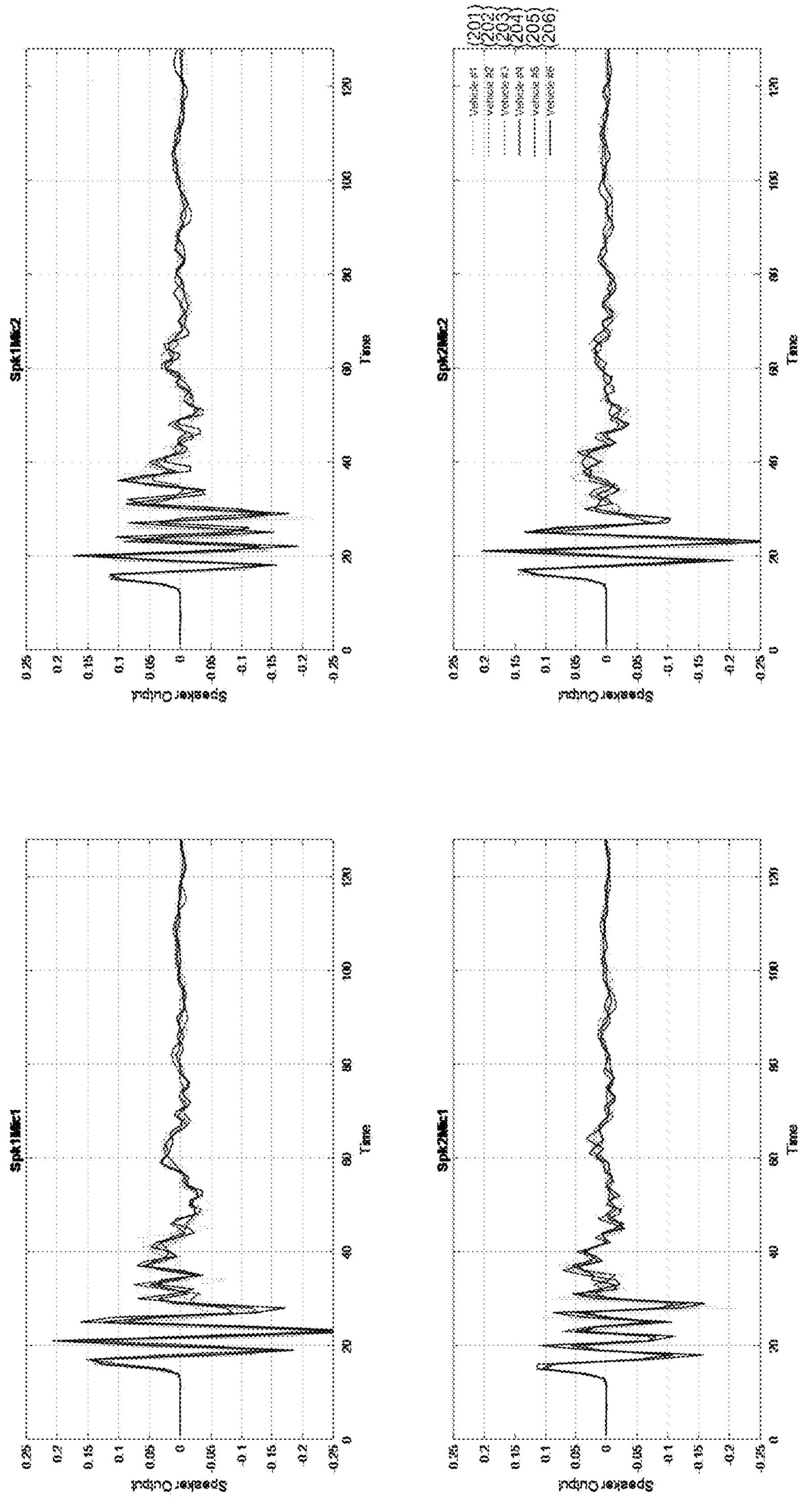
FIG. 2 shows example impulse response plots for different microphone-speaker pairs.

Referring now to FIG. 2, impulse response plots for different microphone-speaker pairs of a plurality of vehicles are shown. Each of the four plots includes a vertical axis that represents speaker output and a horizontal axis that represents time. Each plot contains traces for six different vehicles of the same type (e.g., vehicle 1 (201); vehicle 2 (202); vehicle 3 (203); vehicle 4 (204); vehicle 5 (205); vehicle 6 (206)). The impulse responses of the six vehicles are indicated by different line types.

The plot on the upper left side of FIG. 2 is a plot of impulse responses for a first speaker-microphone pair (e.g., speaker #1 and microphone #1). The plot on the lower left side of FIG. 2 is a plot of impulse responses for a second speaker-microphone pair (e.g., speaker #2 and microphone #1). The plot on the upper right side of FIG. 2 is a plot of impulse responses for a third speaker-microphone pair (e.g., speaker 1 and microphone #2). The plot on the lower right side of FIG. 2 is impulse responses for a fourth speaker-microphone pair (e.g., speaker #2 and microphone #2).

It may be observed that the none of the impulse responses are identical. In particular, the traces include amplitude variation and some phase variation. The variation may make it difficult to determine degradation or no-degradation operation for particular speaker-microphone pairs apply applying time-domain analysis with thresholds (e.g., amplitude thresholds). The impulse response plots may be generated by dividing output of a particular microphone by input to a particular speaker over a defined time frame during which the speaker input and the microphone output are sampled, measured, and stored to memory. The speaker input may be a broadband impulse as shown in FIG. 3.

Figure 3:
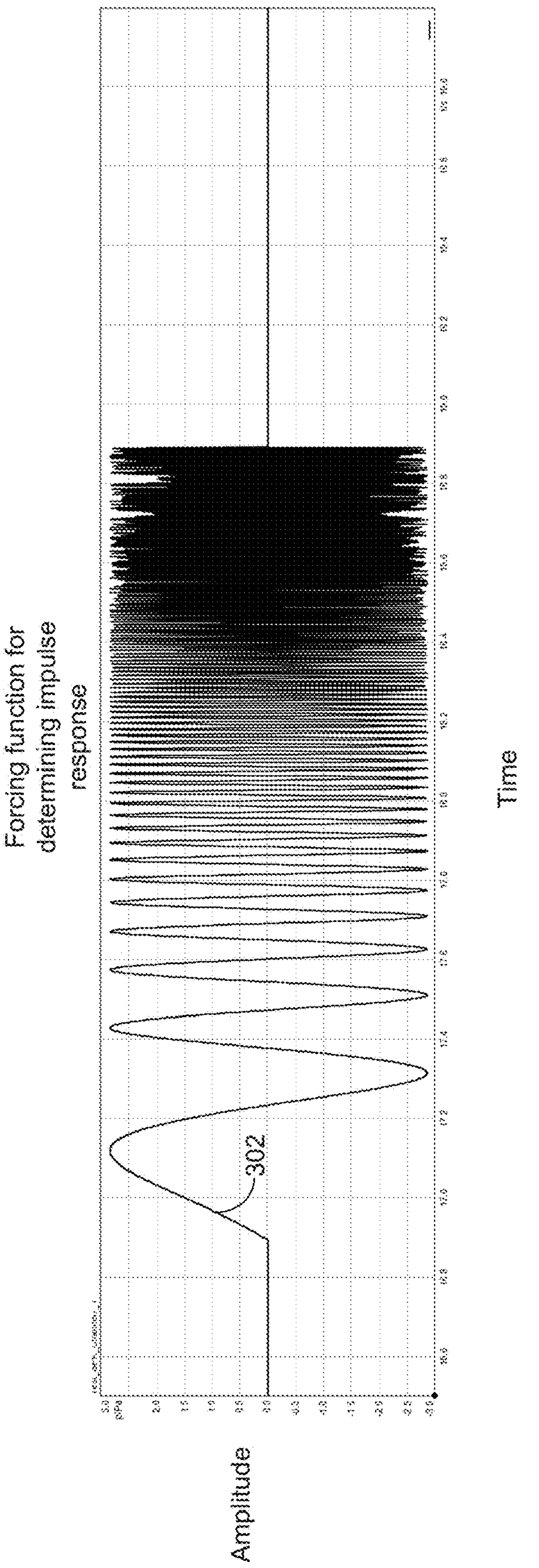
FIG. 3 shows a plot of an example broadband signal for evaluating an impulse response of an active noise cancelling system.

Referring now to FIG. 3, a plot of a broadband signal for evaluating an impulse response of an active noise cancellation system for a vehicle is shown. In this example, broadband signal 302 is a sine wave that is varied in frequency. The sine wave begins with a first predetermined frequency and it ends with a second predetermined frequency, the second predetermined frequency greater than the first predetermined frequency. Signal 302 may be applied to a speaker of an active noise cancellation system to stimulate the active noise cancellation system. Microphones of the active noise cancellation system may respond to the sound that is generated by the speaker that is driven by the broad band impulse signal.

Figure 4:
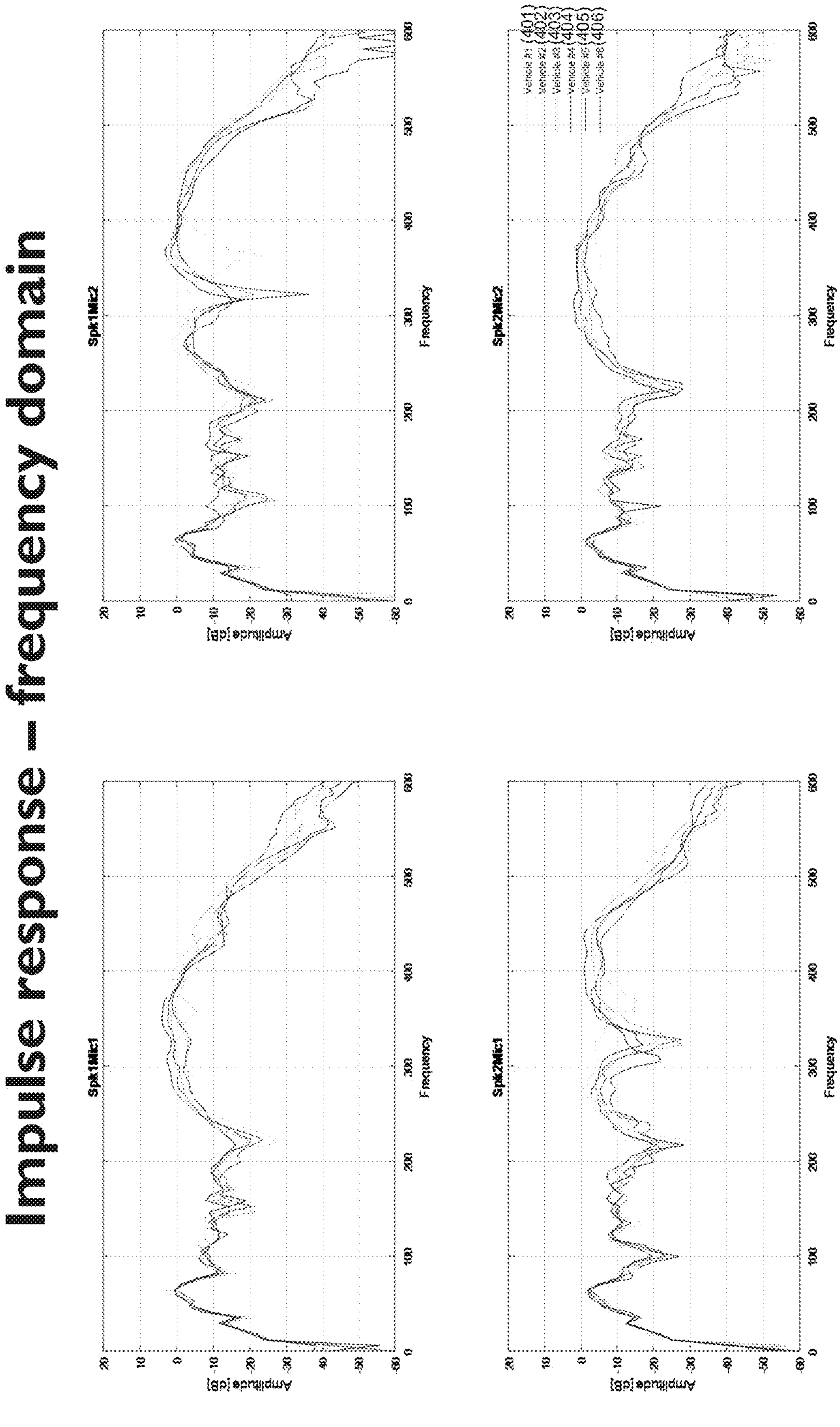
FIG. 4 shows example frequency domain plots of impulse responses.

Referring now to FIG. 4, frequency domain impulse response plots for different microphone-speaker pairs of a plurality of vehicles are shown. Each of the four plots includes a vertical axis that represents amplitude of speaker output and a horizontal axis that represents frequency. Each plot contains traces for six different vehicles of the same type (e.g., vehicle 1 (401); vehicle 2 (402); vehicle 3 (403); vehicle 4 (404); vehicle 5 (405); vehicle 6 (406)). The frequency domain impulse responses of the six vehicles are indicated by different line types.

The plot on the upper left side of FIG. 4 is a plot of frequency domain impulse responses for a first speaker-microphone pair (e.g., speaker #1 and microphone #1). The plot on the lower left side of FIG. 4 is a plot of frequency domain impulse responses for a second speaker-microphone pair (e.g., speaker #2 and microphone #1). The plot on the upper right side of FIG. 4 is a plot of frequency domain impulse responses for a third speaker-microphone pair (e.g., speaker 1 and microphone #2). The plot on the lower right side of FIG. 4 is frequency domain impulse responses for a fourth speaker-microphone pair (e.g., speaker #2 and microphone #2).

The frequency domain impulse response plots may be generated by supplying a broadband impulse signal to a speaker and applying a Fourier transform (e.g., a fast Fourier transform) to a result of dividing output of a particular microphone by input to a particular speaker over a defined time frame during which the speaker input and the microphone output are sampled, measured, and stored to memory. In one example, the discrete Fourier transform (DFT) may be expressed as:

$$F(j\omega) = \sum_{k=0}^{N-1} f(k)e^{-j\omega kT}$$

where F is a series of complex numbers that are a function of imaginary number j, ω is angular velocity, f is the function or vector being transformed into the frequency domain, e is Euler's number, k is sample number, and T is sample period. The DFT may be modified to generate a fast Fourier transform that reduces computational time for the active noise cancellation system signals.

Figure 5:
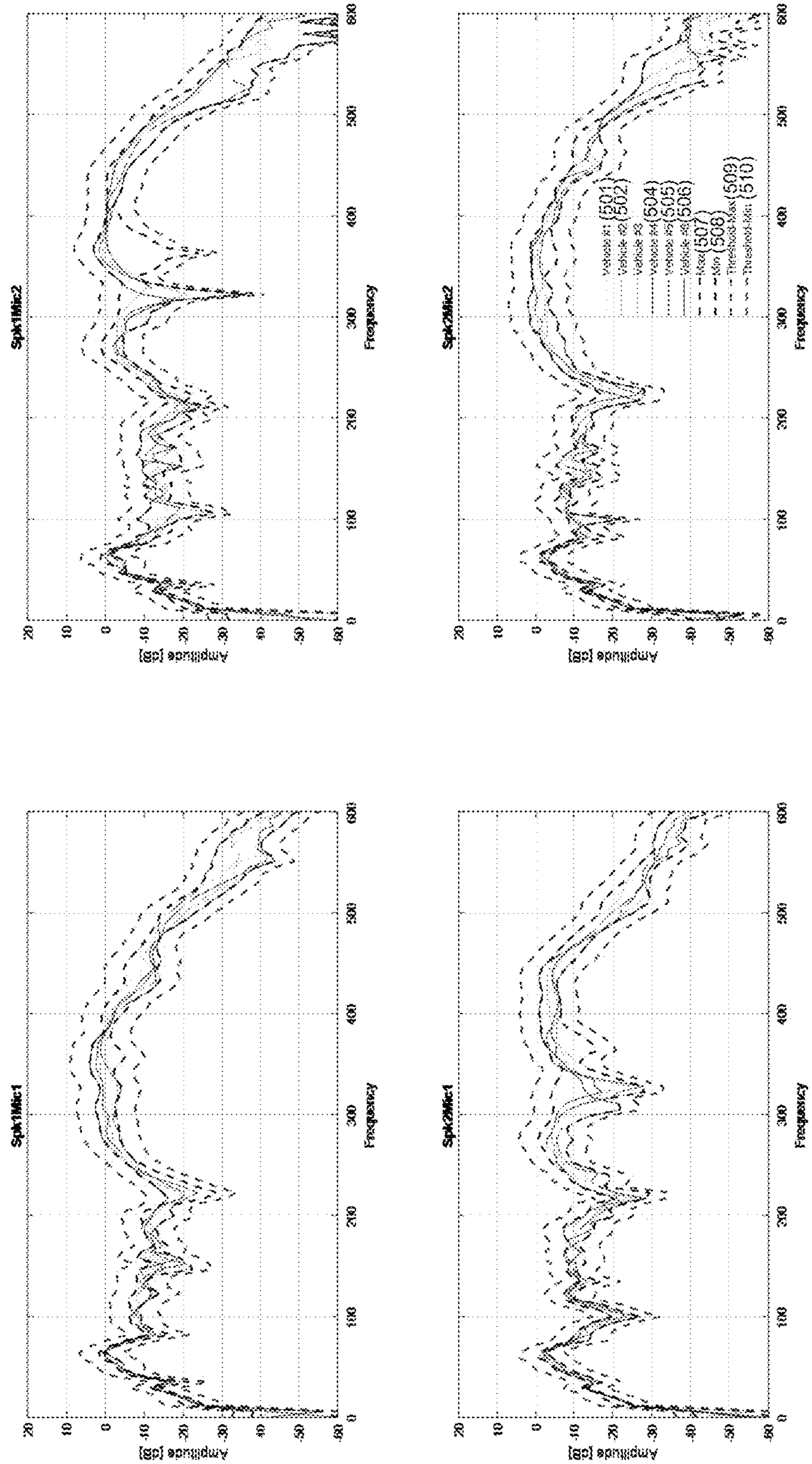
FIG. 5 shows graphic representation of a first frequency domain technique for evaluating an active noise cancellation system.

Referring now to FIG. 5, a first approach for frequency domain impulse response analysis is shown. The plots show how thresholds for evaluating operation of an active noise cancellation system may be determined. FIG. 5 includes plots for different microphone-speaker pairs of a plurality of vehicles are shown. Each of the four plots includes a vertical axis that represents amplitude of speaker output and a horizontal axis that represents frequency. Each plot contains traces for six different vehicles of the same type (e.g., vehicle 1 (501); vehicle 2 (502); vehicle 3 (503); vehicle 4 (504); vehicle 5 (505); vehicle 6 (506)) minimum (508) and maximum (507) amplitudes traces for the six vehicles, and max (509) and minimum (510) thresholds for determining degradation/no-degradation classification of the speaker-microphone pair. The frequency domain impulse responses of the six vehicles are indicated by different line types and the six vehicles are reference vehicles. Note that there may be greater than six or less than six reference vehicles.

The plot on the upper left side of FIG. 5 is a plot of frequency domain impulse responses for a first speaker-microphone pair (e.g., speaker #1 and microphone #1). The plot on the lower left side of FIG. 5 is a plot of frequency domain impulse responses for a second speaker-microphone pair (e.g., speaker #2 and microphone #1). The plot on the upper right side of FIG. 5 is a plot of frequency domain impulse responses for a third speaker-microphone pair (e.g., speaker 1 and microphone #2). The plot on the lower right side of FIG. 5 is frequency domain impulse responses for a fourth speaker-microphone pair (e.g., speaker #2 and microphone #2). Each of the plots displays frequency domain impulse responses for six reference vehicles (e.g., vehicles that are a basis for judging whether or not the present vehicle being assessed for active noise cancellation system operation is operating within acceptable parameters or specifications). The six reference vehicle frequency domain impulse responses provide an indication of the distribution of impulse responses for a group of vehicles.

The frequency domain impulse response plots may be generated by supplying a broadband impulse signal to a speaker and applying a Fourier transform (e.g., a fast Fourier transform) to a result of dividing output of a particular microphone by input to a particular speaker over a defined time frame during which the speaker input and the microphone output are sampled, measured, and stored to memory.

The minimum amplitude curves or values may be generated by selecting the minimum amplitude valve for each frequency from each of the speaker-microphone amplitude-frequency pair. For example, if there are three reference vehicles and an amplitude for vehicle #1 at 100 Hertz (Hz) is −10 dB, an amplitude for vehicle #2 at 100 Hz is −11 dB, and an amplitude for vehicle #3 is −9 dB, the value for the minimum amplitude is −11 dB at 100 Hz because −11 is the smallest value at 100 Hz for the three vehicles. If the amplitude for vehicle #1 at 150 Hertz (Hz) is 0 dB, an amplitude for vehicle #2 at 150 Hz is −1 dB, and an amplitude for vehicle #3 is −3 dB, the value for the minimum amplitude is −3 dB at 150 Hz because −3 is the smallest value at 150 Hz for the three vehicles. The values for the minimum amplitude curve at all frequencies may be determined in a similar way.

The maximum amplitude curves or values may be generated by selecting the maximum amplitude valve for each frequency from each of the speaker-microphone amplitude-frequency pair. For example, if there are three reference vehicles and an amplitude for vehicle #1 at 100 Hertz (Hz) is −10 dB, an amplitude for vehicle #2 at 100 Hz is −11 dB, and an amplitude for vehicle #3 is −9 dB, the value for the maximum amplitude curve is −9 dB at 100 Hz because −9 dB is the largest value at 100 Hz for the three vehicles. If the amplitude for vehicle #1 at 150 Hertz (Hz) is 0 dB, an amplitude for vehicle #2 at 150 Hz is −1 dB, and an amplitude for vehicle #3 is −3 dB, the value for the maximum amplitude is 0 dB at 150 Hz because 0 dB is the largest value at 150 Hz for the three vehicles. The values for the maximum amplitude curve at all frequencies may be determined in a similar way.

The threshold curves for determining whether or not the impulse response of a present vehicle under test may be determined via adding a positive margin (e.g., 0.5 dB) to values of the maximum curve and adding a negative margin value to values in the minimum curve (e.g., −0.5 dB). Thus, as shown in FIG. 5, the threshold maximum curve for a particular speaker-microphone pair is a margin greater than the maximum curve for the speaker-microphone pair. The threshold minimum curve for a particular speaker-microphone pair is a margin less than the minimum curve for the speaker-microphone pair.

An impulse response in the frequency domain for a present active noise cancellation system speaker-microphone pair may be compared to the threshold minimum curve and the threshold maximum curve generated from the reference vehicles for the same speaker-microphone pair. If all values in the impulse response in the frequency domain for the present active noise cancellation system speaker-microphone pair (e.g., speaker #1, microphone #2) lie between the threshold maximum curve and threshold minimum curve, the speaker-microphone pair for the present system may be determined to not be degraded. If one or more values in the impulse response in the frequency domain for the present active noise cancellation system speaker-microphone pair (e.g., speaker #1, microphone #2) lie outside of the threshold maximum curve and threshold minimum curve, the speaker-microphone pair for the present system may be determined to be degraded.

Figure 6:
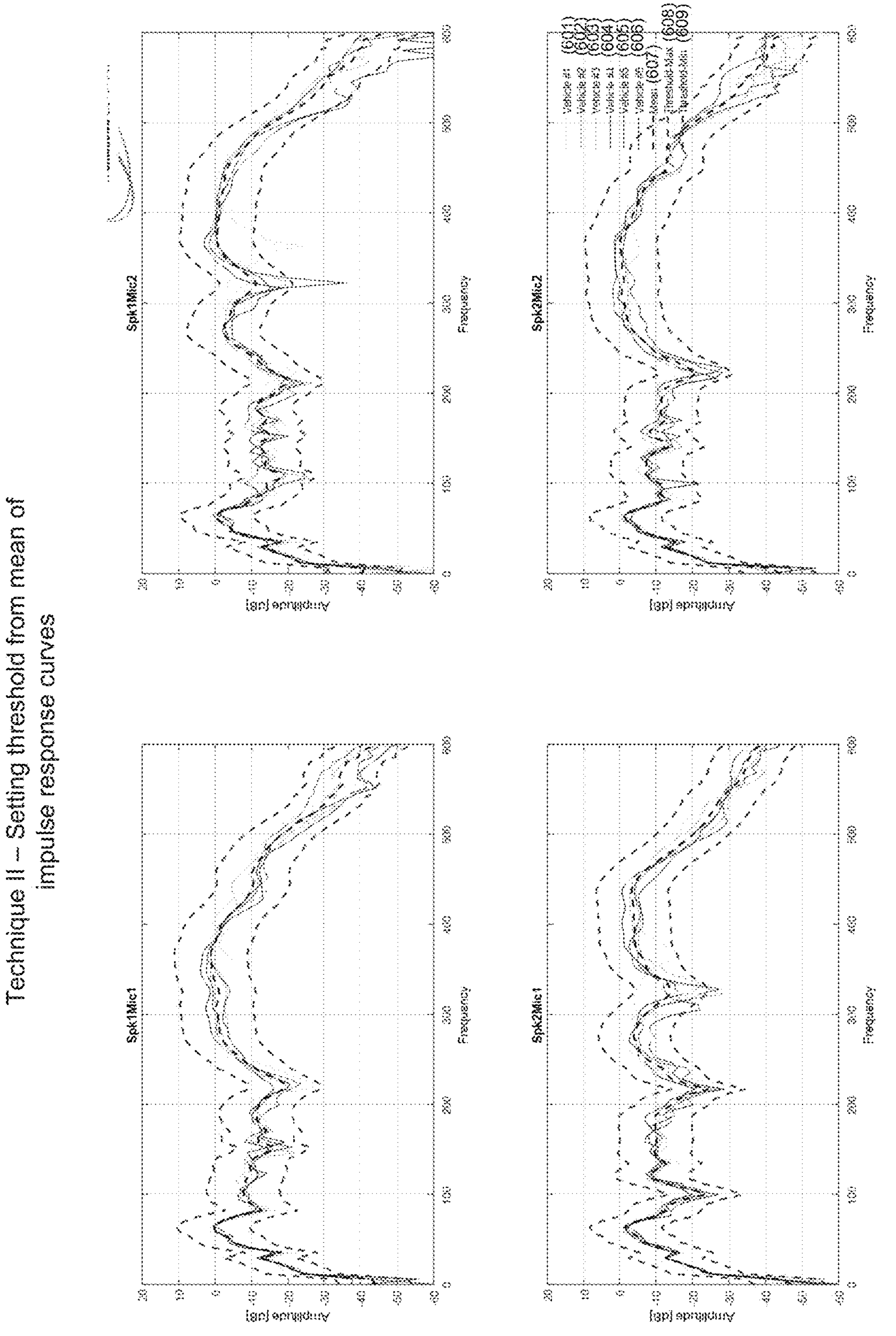
FIG. 6 shows graphic representation of a second frequency domain technique for evaluating an active noise cancellation system.

Referring now to FIG. 6, a second approach for frequency domain impulse response analysis is shown. The plots show how thresholds for evaluating operation of an active noise cancellation system may be determined. FIG. 6 includes plots for different microphone-speaker pairs of a plurality of vehicles are shown. Each of the four plots includes a vertical axis that represents amplitude of speaker output and a horizontal axis that represents frequency. Each plot contains traces for six different vehicles of the same type (e.g., vehicle 1 (601); vehicle 2 (602); vehicle 3 (603); vehicle 4 (604); vehicle 5 (605); vehicle 6 (606)) mean curve (607) amplitudes traces for the six vehicles, and max (608) and minimum (609) thresholds for determining degradation/no-degradation classification of the speaker-microphone pair. The frequency domain impulse responses of the six vehicles are indicated by different line types and the six vehicles are reference vehicles. Note that there may be greater than six or less than six reference vehicles.

The plot on the upper left side of FIG. 6 is a plot of frequency domain impulse responses for a first speaker-microphone pair (e.g., speaker #1 and microphone #1). The plot on the lower left side of FIG. 6 is a plot of frequency domain impulse responses for a second speaker-microphone pair (e.g., speaker #2 and microphone #1). The plot on the upper right side of FIG. 6 is a plot of frequency domain impulse responses for a third speaker-microphone pair (e.g., speaker 1 and microphone #2). The plot on the lower right side of FIG. 6 is frequency domain impulse responses for a fourth speaker-microphone pair (e.g., speaker #2 and microphone #2). Each of the plots displays frequency domain impulse responses for six reference vehicles. The six reference vehicle frequency domain impulse responses provide an indication of the distribution of impulse responses for a group of vehicles.

The frequency domain impulse response plots may be generated by supplying a broadband impulse signal to a speaker and applying a Fourier transform (e.g., a fast Fourier transform) to a result of dividing output of a particular microphone by input to a particular speaker over a defined time frame during which the speaker input and the microphone output are sampled, measured, and stored to memory.

The mean amplitude curve or values may be generated by determining a mean amplitude valve for each frequency from each of the speaker-microphone amplitude-frequency pairs. For example, if there are three reference vehicles and an amplitude for vehicle #1 at 100 Hertz (Hz) is −10 dB, an amplitude for vehicle #2 at 100 Hz is −11 dB, and an amplitude for vehicle #3 is −9 dB, the value for the mean amplitude is −10 dB at 100 Hz because −10 is the mean value at 100 Hz for the three vehicles. If the amplitude for vehicle #1 at 150 Hertz (Hz) is 0 dB, an amplitude for vehicle #2 at 150 Hz is −1 dB, and an amplitude for vehicle #3 is −3 dB, the value for the mean amplitude is −1.3 dB at 150 Hz because −1.3 dB is the smallest value at 150 Hz for the three vehicles. The values for the minimum amplitude curve at all frequencies may be determined in a similar way.

The threshold curves for determining whether or not the impulse response of a present vehicle under test may be determined via adding a positive margin (e.g., 0.5 dB) to values of the mean curve to generate a maximum threshold curve and adding a negative margin value to values in the mean curve (e.g., –0.5 dB) to generate a minimum threshold curve. Thus, as shown in FIG. 6, the threshold maximum curve for a particular speaker-microphone pair is a margin greater than the mean curve for the speaker-microphone pair. The threshold minimum curve for a particular speaker-microphone pair is a margin less than the mean curve for the speaker-microphone pair.

An impulse response in the frequency domain for a present active noise cancellation system speaker-microphone pair may be compared to the threshold minimum curve and the threshold maximum curve generated from the reference vehicles for the same speaker-microphone pair. If all values in the impulse response in the frequency domain for the present active noise cancellation system speaker-microphone pair (e.g., speaker #1, microphone #2) lie between the threshold maximum curve and threshold minimum curve, the speaker-microphone pair for the present system may be determined to not be degraded. If one or more values in the impulse response in the frequency domain for the present active noise cancellation system speaker-microphone pair (e.g., speaker #1, microphone #2) lie outside of the threshold maximum curve and threshold minimum curve, the speaker-microphone pair for the present system may be determined to be degraded.

Figure 7:
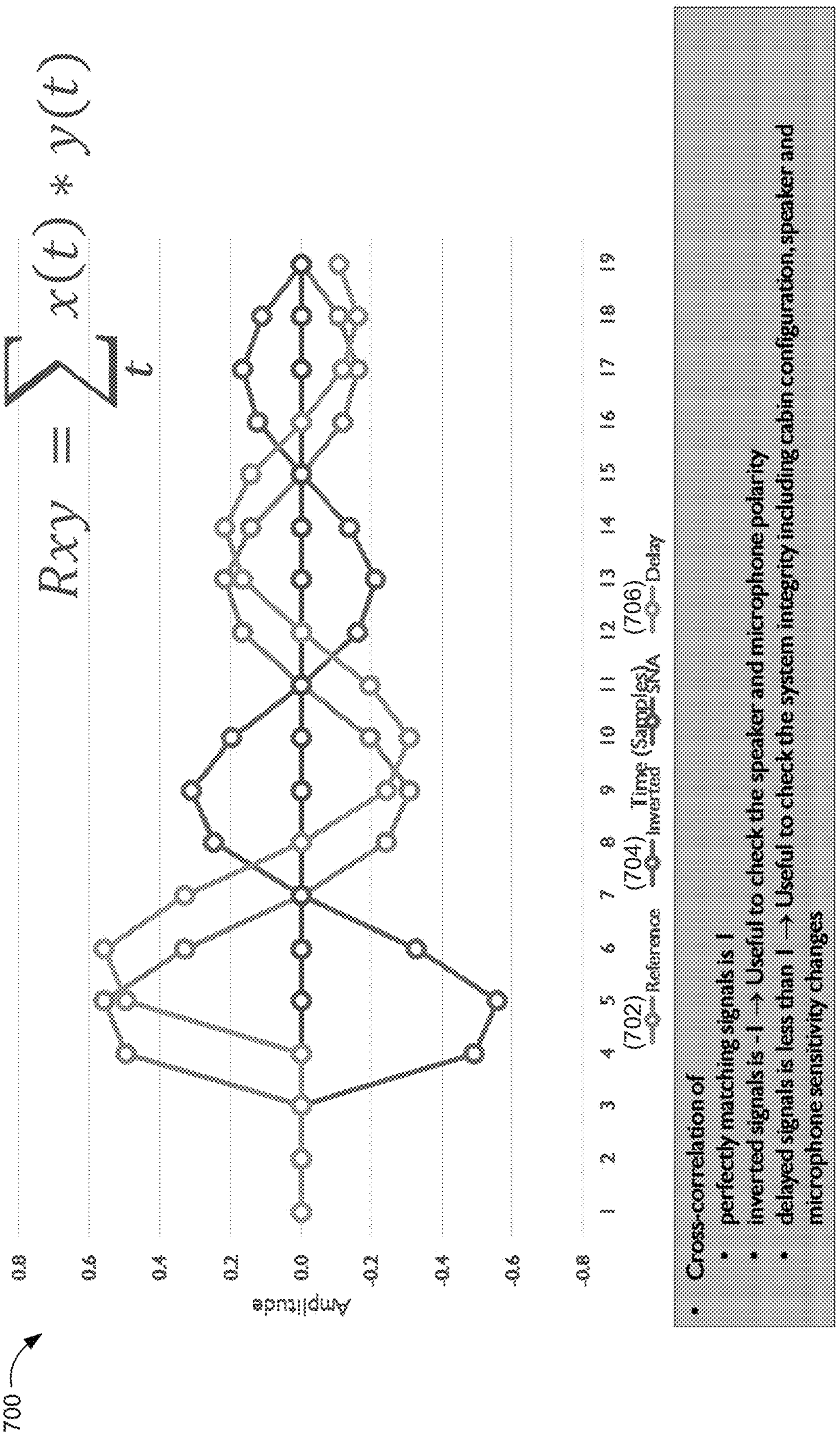
FIG. 7 is a plot that shows different example signal types that may be evaluated by applying cross-correlation is shown.

Turning now to FIG. 7, a plot of different signals that may be evaluated via cross-correlation is shown. FIG. 7 also describes active noise cancellation system conditions that may be indicated by cross-correlation and/or a correlation coefficient. Plot 700 shows three curves. Curve 702 is a reference curve. Curve 704 is an inverse of the reference curve. Curve 706 is a delayed version of reference curve 702.

Discrete cross-correlation may be expressed as:

$$R_{xy} = \sum_{k=1}^{N} x(k) \cdot y(k)$$

where k is the sample number, x(k) is the reference speaker-microphone pair impulse response data vector, y(k) is the present speaker-microphone pair being evaluated impulse response data vector, and N is the total number of data points in the two data vectors. The cross-correlation may be performed to determine similarity between the reference impulse response of a speaker-microphone pair or a speaker-accelerometer pair and the impulse response of a speaker-microphone pair or a speaker-accelerometer pair of the present active noise cancellation system under test. Alternatively, or in addition, a correlation coefficient may be determined to indicate similarity between the reference impulse response of a speaker-microphone pair and a speaker-microphone pair of the present active noise cancellation system under test. The correlation coefficient may be expressed as:

$$c_{xy} = \frac{x \cdot y}{\sqrt{|x|^2 |y|^2}}$$

where x is a data vector, y is a data vector, and $c_{xy}$ is the correlation coefficient. If the impulse response of the presently evaluated speaker-microphone pair is an exact match with the reference impulse response, the correlation coefficient value is 1. If the impulse response of the presently evaluated speaker-microphone pair is inverted from the referenced impulse response, the correlation coefficient value is −1. If the impulse response of the presently evaluated speaker-microphone pair is delayed from the referenced impulse response, the correlation coefficient value is less than 1. A correlation coefficient of −1 may be indicative of a speaker or microphone that has improper polarity of their electrical connections.

Referring now to FIG. 8, visual aids for evaluating an active noise cancellation system via correlation coefficient are shown. FIG. 8 includes a first plot 802 that shows correlation coefficient values for one microphone (e.g., microphone 2) and seven speakers (S1-S7). The speaker indications S1-S7 are organized in a polygon and equally spaced about an origin 804. Black line 806 represents a maximum correlation coefficient of 1 at each speaker indication S1-S7. Line 808 represents an example correlation threshold value for a non-degraded microphone #2 (e.g., 0.8 or 80%). In this example, the correlation coefficients for each of speaker pairs S1-S4 and microphone #2 are acceptable, but the correlation coefficients for each of speaker pairs S5-S6 falls short of the threshold. Consequently, the speaker-microphone pairs S5/M2, S6/M2, and S7/M2 may be considered degraded.

FIG. 8 includes a second plot 820 that is similar to the first plot of FIG. 8, the second plot 820 illustrates one minus the correlation coefficient values for speakers S1-S7 and microphone #2. This may be illustrative to show error from maximum correlation.

Figure 9:
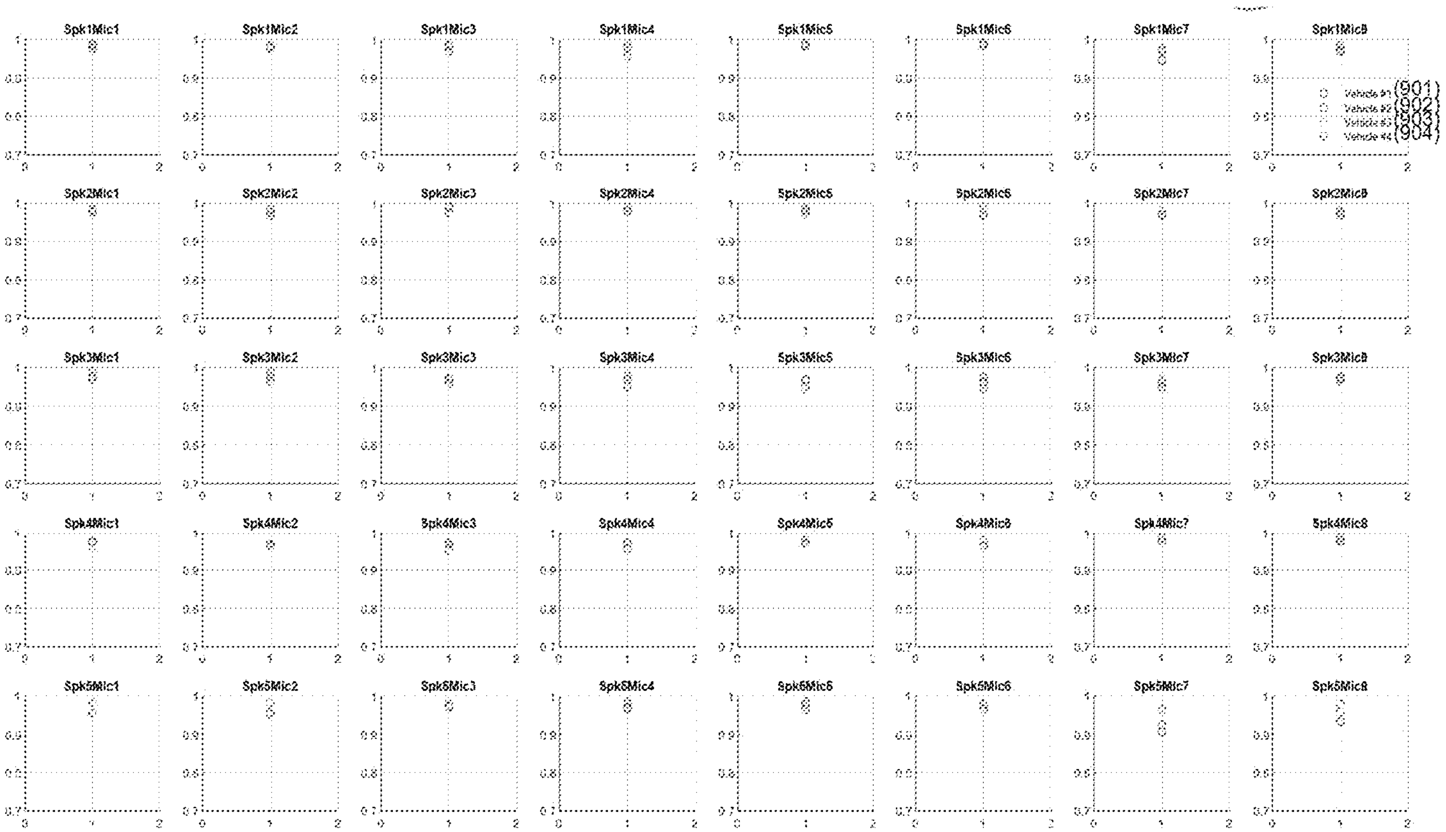

Moving on to FIG. 9, plots of correlation coefficient values for a plurality of speaker-microphone pairs are shown. In this example, forty plots of correlation coefficients for four different vehicles are shown. The correlation coefficient values are represented for each vehicle as indicated by circles 901-904. The plots are labeled to show which of the speaker-microphone pairs the correlation coefficients correspond to. For example, the upper most plot on the left side of FIG. 9 shows correlation coefficient values for speaker #1 and microphone #1. This plot is labeled "Spk1Mic1" as an indication of the speaker-microphone pair that the correlation coefficients correspond to.

FIG. 9 also lists steps for evaluating impulse responses for speaker-microphone pairs based on correlation coefficients.

In particular, impulse response curves (e.g., the curves shown in FIG. 2) of a particular speaker-microphone pair for a plurality of vehicles are time aligned and averaged at each sample time to generate a speaker-microphone data vector that is the average of all impulse response data vectors for each reference vehicle at each same time. For example, if there are only two impulse response data vectors for a speaker #1/microphone #2 pair, and one of the data vectors has a value of 0.9 at 0.5 seconds and the other data vector has a value of 0.8 at 0.5 seconds, then the value at 0.5 seconds for the averaged impulse response vector is 0.85. If the one data impulse response data vector has a value of 0.8 at 0.75 seconds and the other impulse response data vector has a value of 0.7 at 0.75 seconds, then the value of the averaged impulse response data vector is 0.75 at 0.75 seconds. Averages at other times for generating the average impulse response data vector may be determined in a similar way.

In a second step, a correlation coefficient is determined according to the speaker-microphone pair (e.g., speaker #1/microphone #2) averaged impulse response data vector for the plurality of vehicles and the speaker-microphone pair (e.g., speaker #1/microphone #2) impulse response for the present vehicle under test or being evaluated. This correlation coefficient may be compared to a minimum correlation coefficient minus an offset for the reference vehicles that were used to generate the average impulse response vector for the reference vehicles in the above described step. For example, if the correlation coefficient for the speaker-microphone pair of speaker #1/microphone #2 for the present vehicle under test or being evaluated is 0.7, the correlation coefficient for the speaker-microphone pair of speaker #1/microphone #2 for a first reference vehicle is 0.82, the correlation coefficient for the speaker-microphone pair of speaker #1/microphone #2 for a second reference vehicle is 0.85, the correlation coefficient for the speaker-microphone pair of speaker #1/microphone #2 for a third reference vehicle is 0.9, the offset is 0.02, then the speaker-microphone pair speaker #1/microphone #2 may be determined to be degraded because 0.82 (minimum correlation coefficient for the three reference vehicles) minus 0.02 (offset/margin value) is 0.8, which is greater than 0.7 (the correlation coefficient of the present vehicle under test).

Figure 10:
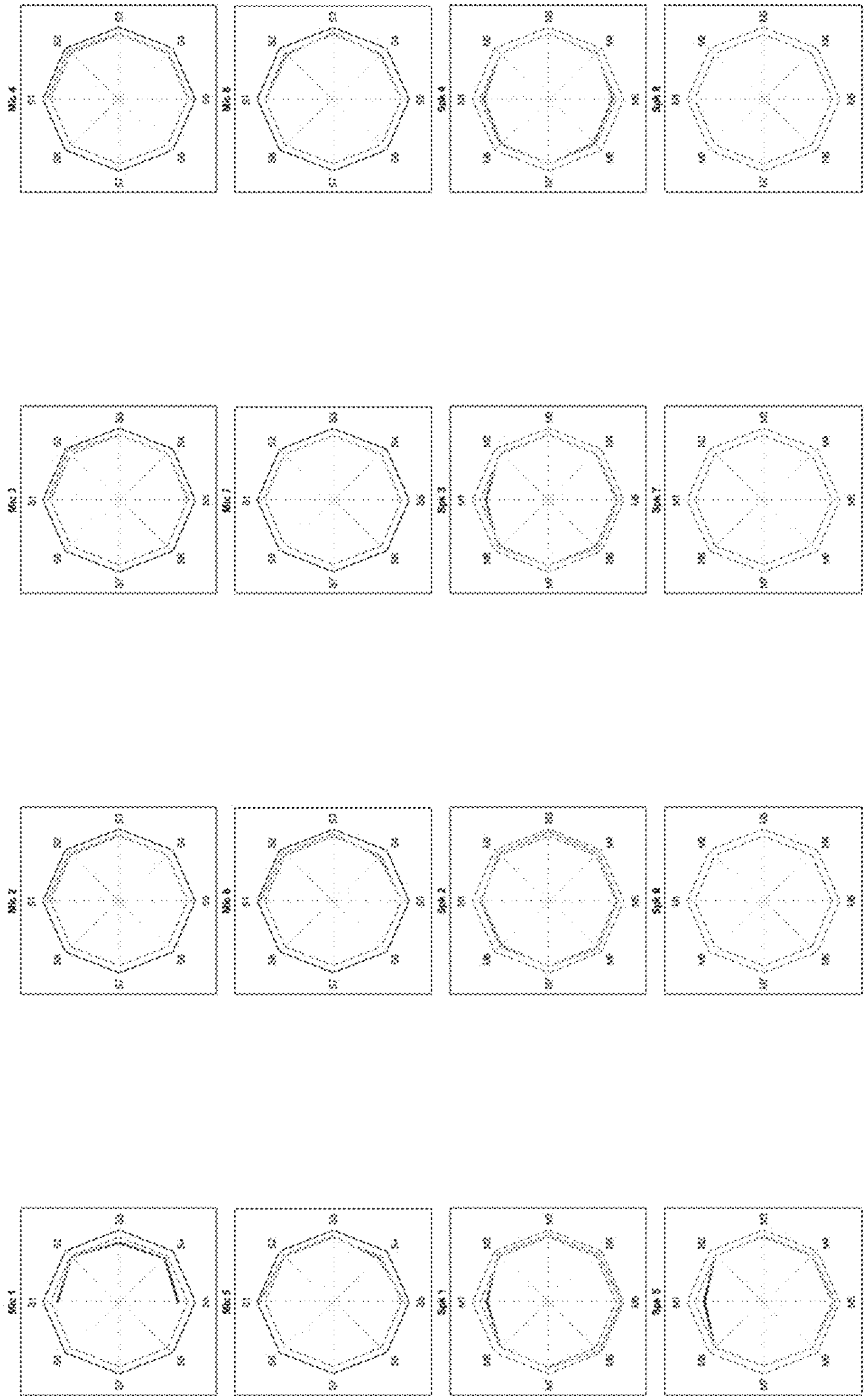

Referring now to FIG. 10, plots for visualizing correlation analysis are shown. FIG. 10 includes sixteen plots and each plot corresponds to a microphone and the microphone is identified at the top of each plot. The plots are similar to plot 802 in FIG. 8. Each plot shows correlation coefficient values for a speaker-microphone pair and the correlation coefficient values are tied together via lines to show relationships between speaker input and microphone output. FIG. 10 shows that the correlation coefficient of microphone #1 is below a threshold value. Therefore, microphone #1 may be determined to be degraded.

Figure 11:
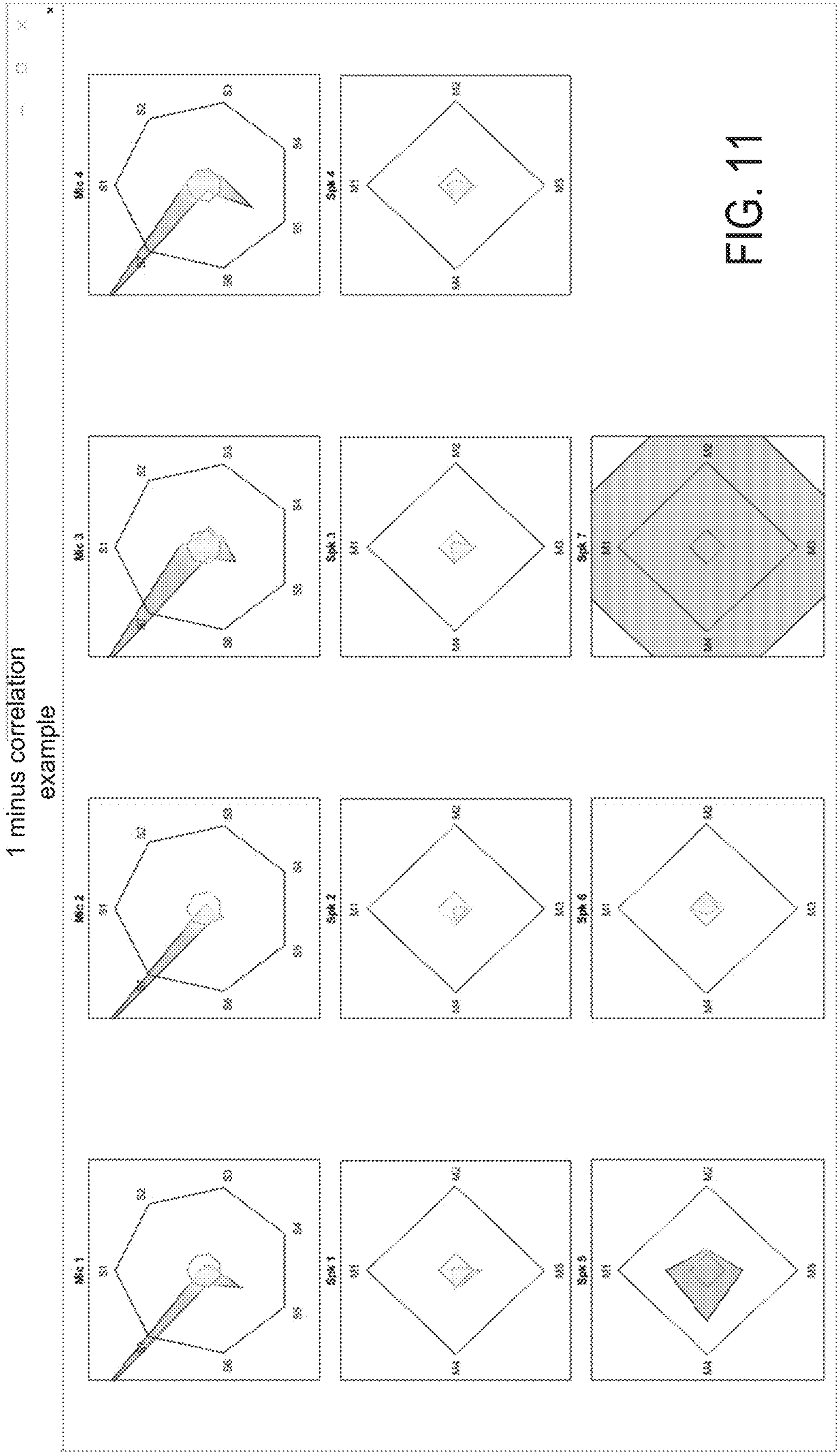

Referring now to FIG. 11, plots for visualizing correlation analysis are shown. FIG. 11 includes eleven plots and the plots show one minus correlation coefficient analyst. Microphone plots indicate which microphone the plot is associated with (e.g., Mic 1=microphone #1). Speaker plots indicate which speaker the plot is associated with (e.g., Spk 1=speaker #1). Speakers are indicated by SX labels, where X corresponds to an integer. Microphones are indicated by MX, labels where X corresponds to an integer. The plots of FIG. 11 indicate that speaker number seven has inverse polarity wiring and microphone number five reception is muffled.

Figure 12:
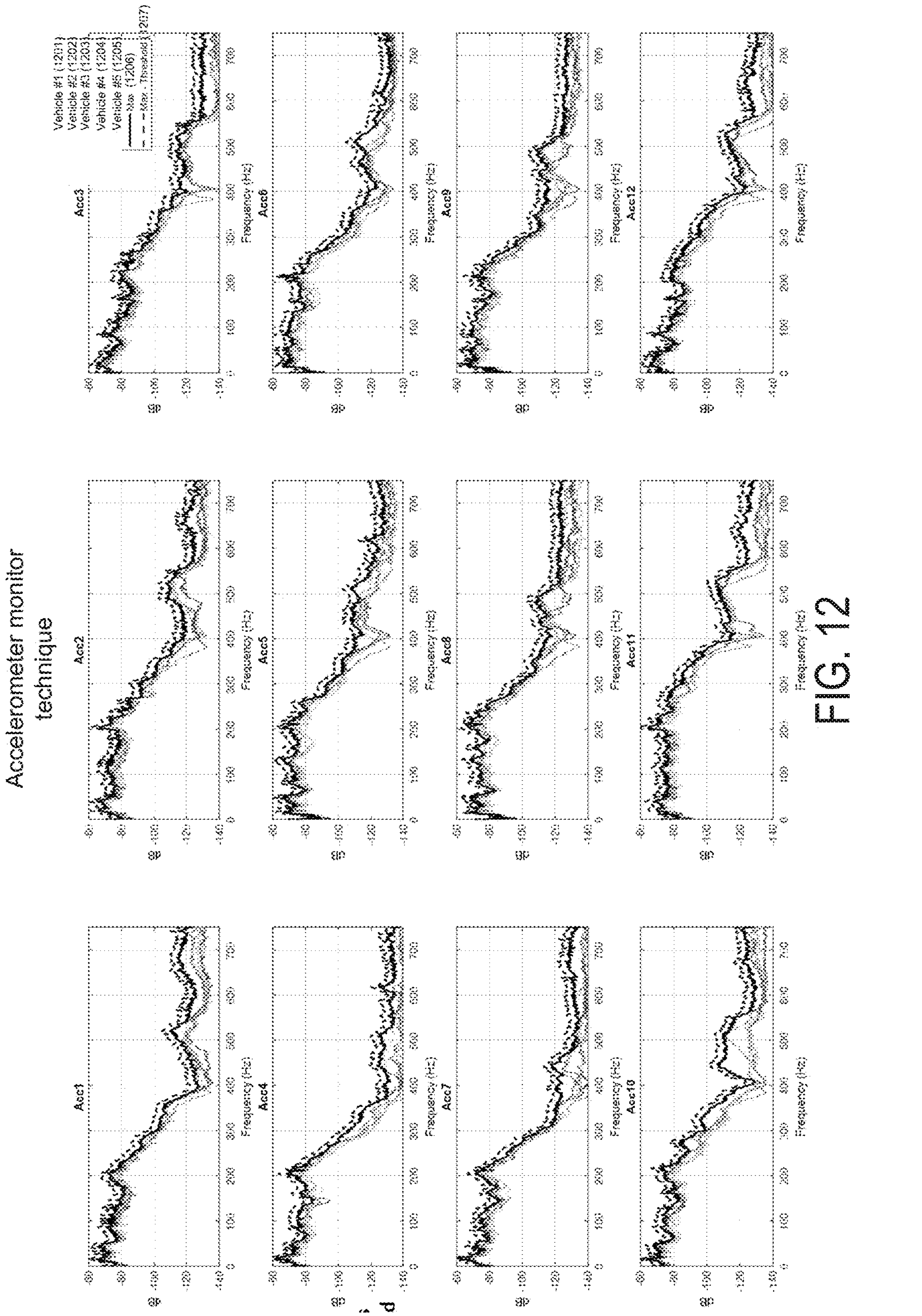
FIG. 12 shows plots for illustrating how vehicle accelerometers may be evaluated.

Referring now to FIG. 12, shows plots illustrating how vehicle accelerometers may be evaluated via a frequency domain impulse response analysis procedure. FIG. 12 includes twelve plots. Each of the twelve plots includes a vertical axis that represents accelerometer amplitude and a vertical axis that represents frequency in Hertz. The accelerometer data includes accelerometer data collected from operating five different vehicles on a same section of a road and the data are shown as five different lines (1201)-(1205). Additionally, each plot includes a maximum valve line (1206) and a maximum threshold line (1207). The plots may be generated by computing a frequency spectrum from output of an accelerometer according to a plurality of driving conditions (e.g., driving on different roads). Determining a maximum curve by determining a maximum amplitude value at each frequency from the plurality of driving conditions and connecting the maximum amplitude values to generate the maximum curve. The maximum curve may be converted to a maximum threshold curve by adding a margin or offset value to each value of the maximum curve. Output of a vehicle accelerometer may be converted into the frequency domain and compared to the maximum threshold curve. If the accelerometer frequency domain output exceeds the maximum threshold curve at a point or position, the accelerometer may be determined to be degraded.

Figure 13:
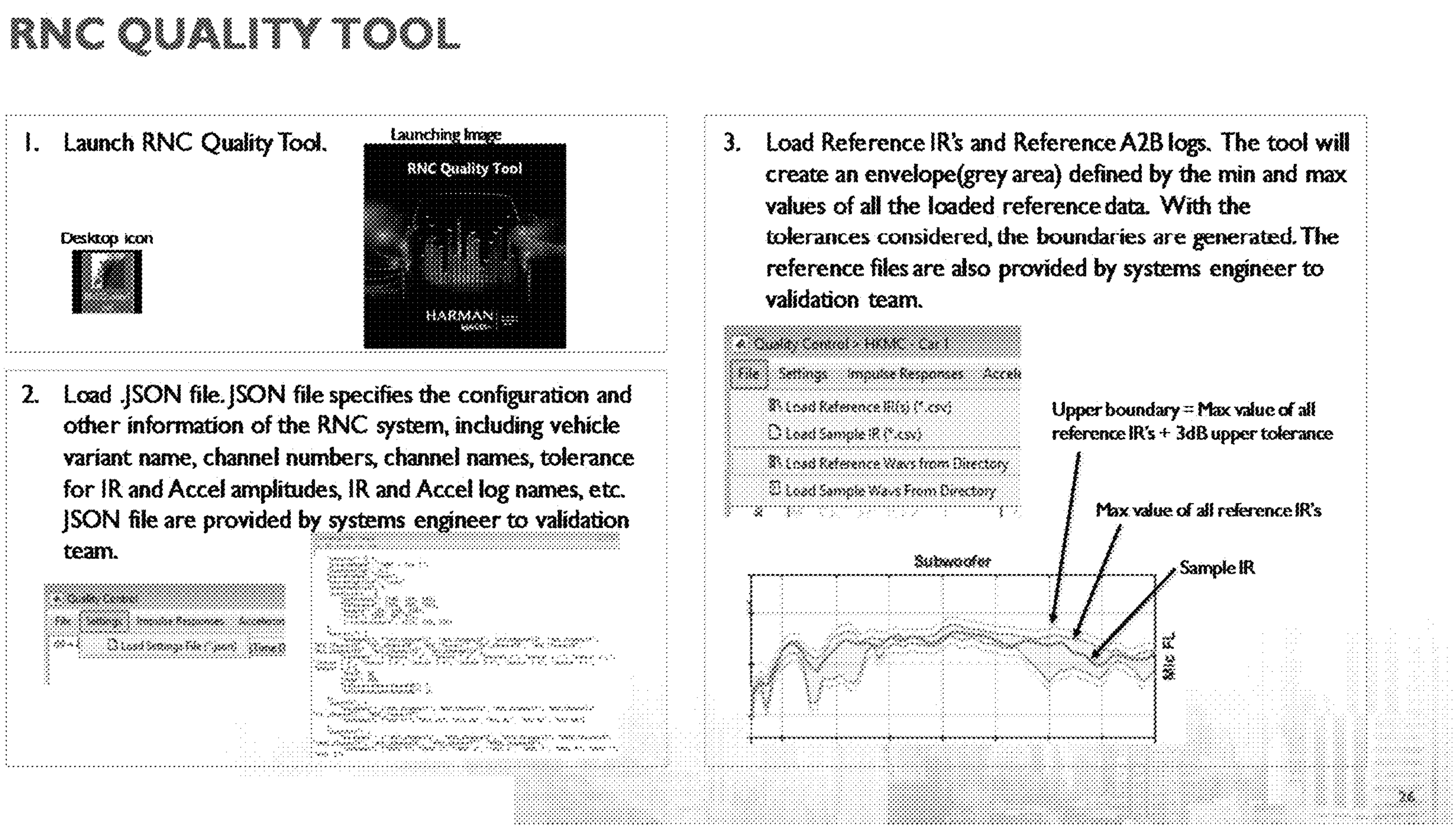
Figure 14:
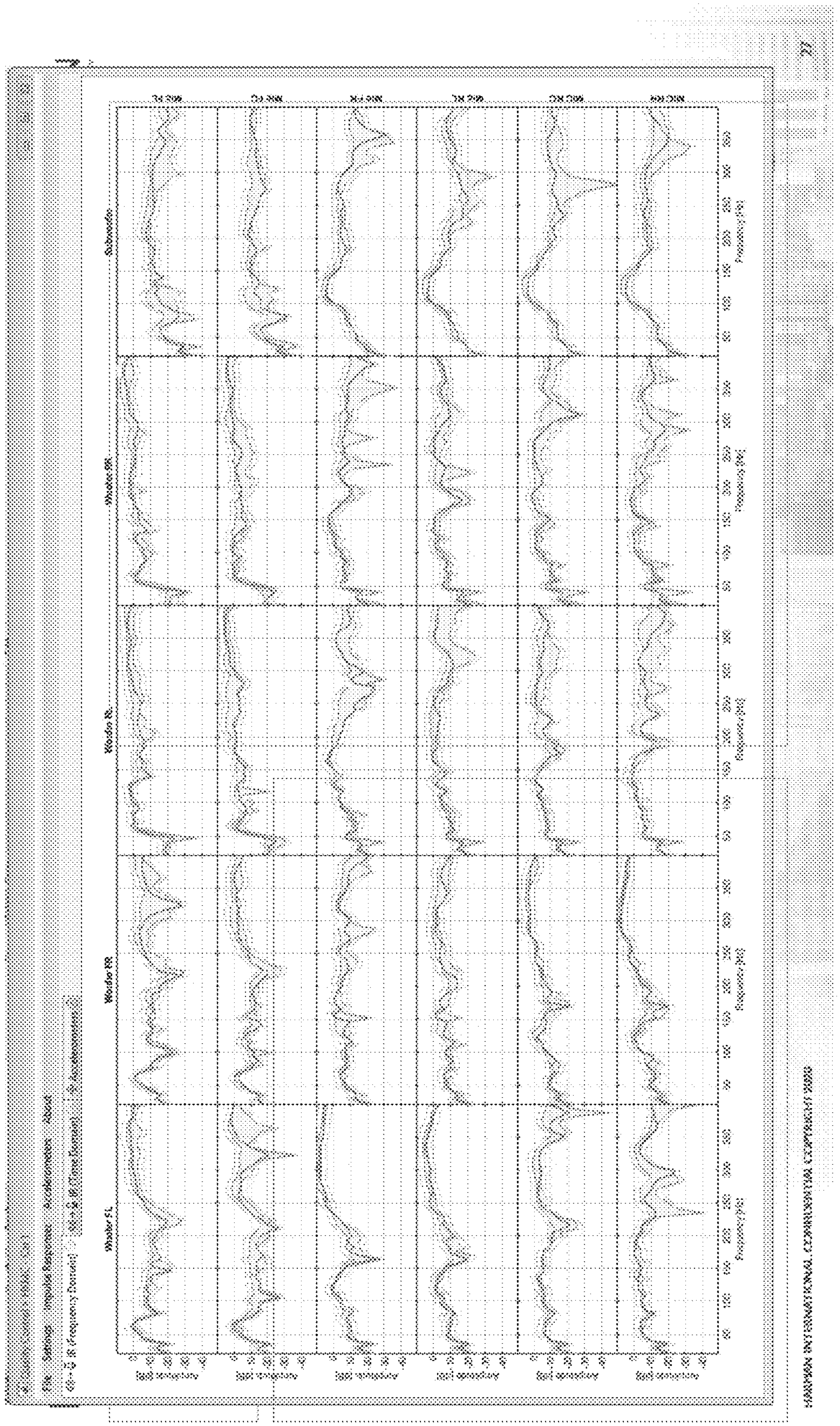

FIGS. 13-16 show features of a vehicle active noise cancellation system diagnostic tool. In particular, FIG. 13 shows that configuration data, channel numbers, channel names, impulse response tolerances, and accelerometer amplitudes may be loaded to the tool. The tool may display boundary ranges for analysis of each of the various system components. Frequency domain responses of the various system actuators and sensors may be plotted as shown in FIG. 14. Different tabs are provided to partition impulse response data as shown in FIG. 15. Additionally, frequency domain impulse response data that is out of range may be highlighted to increase visibility. FIG. 16 shows how degraded sensors may be indicated.

Figure 17:
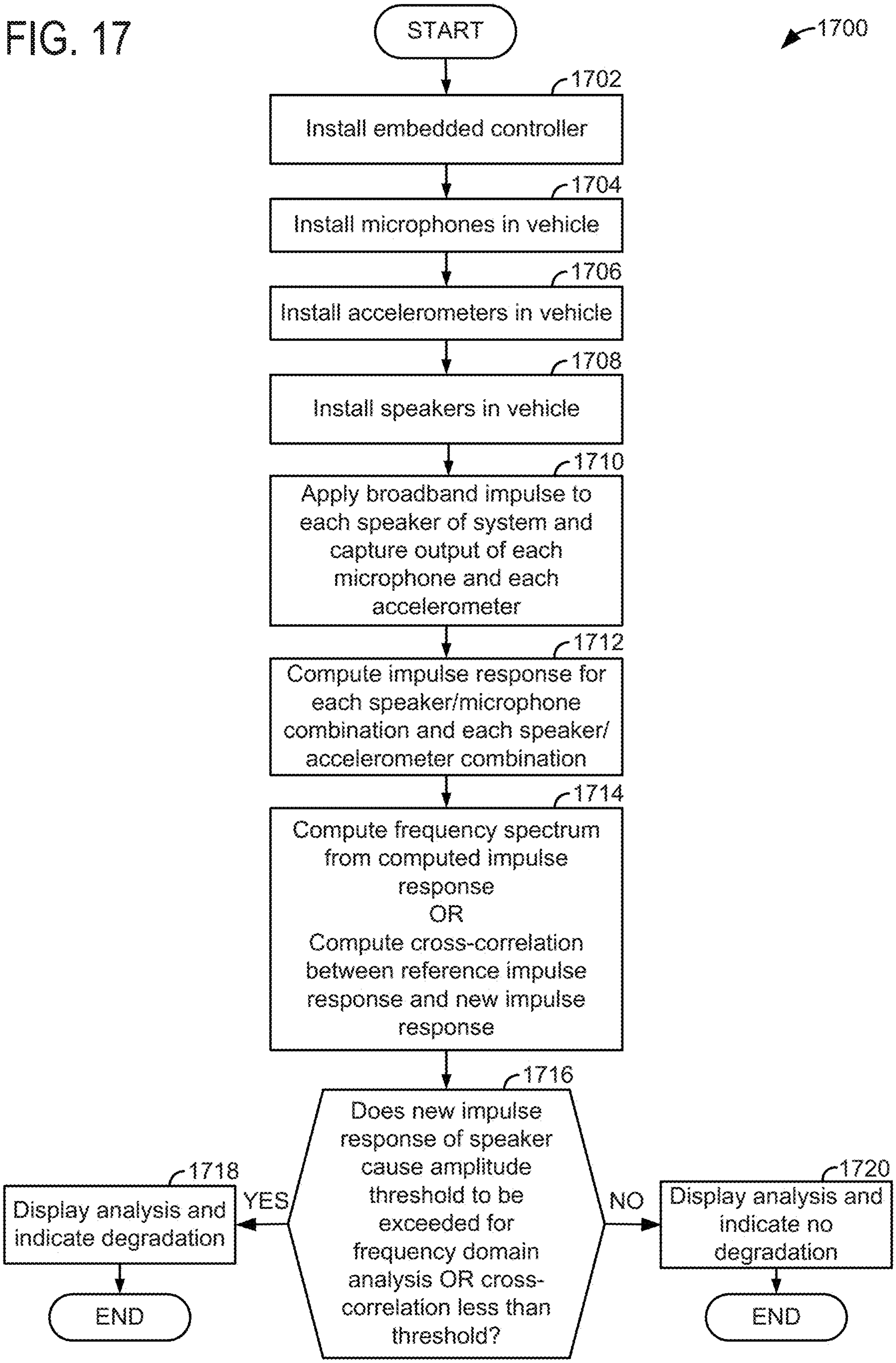
FIG. 17 shows a method for evaluating operation of an active noise cancellation system for a vehicle.

Referring now to FIG. 17, a method for evaluating operation of an active noise cancellation system for a vehicle is shown. The method of FIG. 17 may be included in the system of FIG. 1 as executable instructions stored in controller memory. The method of FIG. 17 may be executed via a controller of a remote device or of an in-vehicle device. The method of FIG. 17 may diagnose an active noise cancellation system and generate the curves or traces shown in the plots included herein.

At 1702, an embedded controller of an active noise cancellation system is installed into a vehicle on an assembly line. The installation includes fastening the embedded controller to the vehicle. Method 1700 proceeds to 1704.

At 1704, speakers of an active noise cancellation system are installed into a vehicle on an assembly line. The installation includes fastening the speakers to the vehicle and electrically connecting the speakers to the embedded controller. Method 1700 proceeds to 1706.

At 1706, microphones of an active noise cancellation system are installed into a vehicle on an assembly line. The installation includes fastening the microphones to the vehicle and electrically connecting the microphones to the embedded controller. Method 1700 proceeds to 1708.

At 1708, accelerometers of an active noise cancellation system are installed into a vehicle on an assembly line. The installation includes fastening the accelerometers to the vehicle and electrically connecting the accelerometers to the embedded controller. Method 1700 proceeds to 1710.

At 1710, a broadband impulse signal is delivered to each speaker of the active noise cancellation system. Each speaker is provided with the broadband impulse signal at a different time than the other speakers of the system so that output of one speaker does not interfere with the output of a different speaker. Method 1700 also captures output from each microphone and accelerometer while during time windows when each speaker is driven by the broadband impulse signal. The microphone output may be stored as data in controller memory. Method 1700 proceeds to 1712.

At 1712, method 1700 computes an impulse response for each speaker-microphone combination and speaker-accelerometer combination. The impulse response may be computed by dividing a data vector from a microphone by data that represents input to the speaker, the speaker with output that is being sensed by the microphone. In other words, for a speaker-microphone pair, data representing output of the microphone is divided by data representing input to the speaker. Thus, for speaker-microphone pair speaker #1/microphone #2, data representing the output of microphone #1 is divided by the data representing input to speaker #1. Method 1700 proceeds to 1714.

At 1714, method 1700 computes frequency spectrums for the impulse responses determined in step 1712. The frequency response may be computed via a Fourier transform as discussed earlier. Alternatively, method 1700 may compute a correlation coefficient between a reference impulse response and the impulse response determined at step 1712. In still other examples, method 1700 may compute a cross-correlation between the reference impulse response and the impulse response determined at step 1712. Method 1700 proceeds to 1716.

At 1716, for frequency domain analysis, method 170 judges whether or not the amplitude in the frequency domain of the impulse responses determined at step 1712 is outside of a threshold range between two boundaries. Alternatively, method 170 judges whether or not the amplitude in the frequency domain of the impulse response determined at step 1712 exceeds a threshold boundary. The amplitude thresholds may be determined via one of the methods described herein.

For correlation coefficient analysis, method 1700 may judge if the correlation coefficient value generated at step 1714 is less than a threshold correlation coefficient value.

If an amplitude is outside of a boundary or exceeds a boundary for frequency domain analysis, or if a correlation coefficient is less than a correlation coefficient generated at step 1714, for one of the speaker-microphone pairs, the answer is yes and method 1700 proceeds to 1718. Otherwise, the answer is no and method 1700 proceeds to 1720.

If method 1700 performs a cross-correlation between the reference impulse response and the impulse response of the present unit under test, method 1700 may proceed to 1718 if results of the cross-correlation are less than a threshold boundary.

At 1718, method 1700 displays the frequency domain analysis or the cross-correlation analysis data and provides an indication of sensor or actuator degradation. Method 1700 proceeds to exit.

At 1720, method 1700 displays the frequency domain analysis or the cross-correlation analysis data and indicates no sensor or actuator degradation. Method 1700 proceeds to exit.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the circuitry shown in FIG. 3. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A diagnostic tool for an active noise cancelling system, comprising:

a controller including executable instructions stored in non-transitory memory that cause the controller to initiate an impulse response diagnostic for the active noise cancelling system, where the impulse response diagnostic includes:

performing a cross-correlation between a reference impulse response and an impulse response of the active noise cancelling;

generating a correlation coefficient based on the reference impulse response and the impulse response of the active noise cancelling system; and generating an indication of degradation of the active noise cancelling system according to a value of the correlation coefficient, where the indication of degradation is an indication of a speaker wired with an inverse electric polarity.

2. The diagnostic tool of claim 1, where the impulse response diagnostic includes supplying a broadband signal to one or more speakers of the active noise cancelling system and generating sound via the one or more speakers in response to the broadband signal.

3. The diagnostic tool of claim 2, where the sound is sensed via one or more microphones or one or more accelerometers of the active noise cancelling system.

4. The diagnostic tool of claim 1, where the reference impulse response is based on a plurality of impulse responses determined from an output device and an input device.

5. The diagnostic tool of claim 4, where the output device is a speaker and where the input device is a microphone or an accelerometer.

6. An active noise cancelling system diagnostic method, comprising:

supplying a broadband signal to a speaker of an active noise cancelling system;

sensing audible output of the speaker responding to the broadband signal via a microphone; and performing cross-correlation analysis on an impulse response generated from a signal output from the microphone sensing the audible output of the speaker, where the impulse response is generated by dividing the signal output from the microphone by the broadband signal, and where the active noise cancelling system is performed at an end of a vehicle assembly line after the speaker and the microphone have been installed in the vehicle, and where performing the cross-correlation analysis includes performing a cross-correlation based on a reference impulse response and the impulse response generated from the signal output from the microphone; and displaying the correlation coefficient via a human/machine interface.

7. The method of claim 6, further comprising generating a correlation coefficient based on the reference impulse response and the impulse response generated from the signal output from the microphone.

8. The method of claim 7, where the reference impulse response is an average impulse response of a plurality of active noise canceling systems of a plurality of vehicles.

9. The method of claim 6, further comprising displaying the correlation coefficient with a plurality of other correlation coefficients from speakers other than the speaker in a polygon shape via the human/machine interface.

10. An end of an assembly line diagnostic tool for an active noise cancelling system, comprising:

a controller including executable instructions stored in non-transitory memory of a vehicle being assembled on the assembly line that cause the controller to initiate an impulse response diagnostic for the active noise cancelling system while the vehicle is positioned at the end of the assembly line, where the impulse response diagnostic includes generating correlation coefficients for a plurality of microphones and accelerometers, and generating an output on a display in response to the generated correlation coefficients.

11. The end of assembly line diagnostic tool of claim 10, where the correlation coefficients for the plurality of microphones include a correlation coefficient for each microphone-speaker pair.

12. The end of assembly line diagnostic tool of claim 11, where the impulse response diagnostic includes performing cross-correlation analysis that includes performing a cross-correlation between an average impulse response of a plurality of active noise cancelling systems of a plurality of vehicles and an impulse response of the active noise cancelling system.

13. The end of assembly line diagnostic tool of claim 12, further comprising determining a minimum cross-correlation between impulse responses of the plurality of active noise cancelling systems of the plurality of vehicles and adding a margin to the minimum cross-correlation between impulse responses of the plurality of active noise cancelling systems.

14. The end of assembly line diagnostic tool of claim 13, further comprising indicating degradation of the active noise cancelling system in response to the cross-correlation of average impulse response of the plurality of active noise cancelling systems and the impulse response of the active noise cancelling system being less than the margin plus the minimum cross-correlation between impulse responses of the plurality of active noise cancelling systems.

* * * * *